Dec. 2, 1952  C. F. MELLIN  2,619,764
ARTIFICIAL FISH LURE
Filed March 18, 1948

*INVENTOR:*
CURTIS F. MELLIN
BY Milo B. Stevens & Co.
ATT'Y.

Patented Dec. 2, 1952

2,619,764

UNITED STATES PATENT OFFICE 2,619,764

ARTIFICIAL FISH LURE

Curtis F. Mellin, Chicago, Ill.

Application March 18, 1948, Serial No. 15,651

2 Claims. (Cl. 43—42.52)

My invention relates to artificial fish lures of the spoon type. Such lures carry a fish hook; and some have a weed guard attachment. Another attachment is one or more spinners to make the lure more realistic while in motion.

Various means have been employed for the attachment of the fish hook, but in many cases the hook is in an unstable position; or soldering or other labor is required to firmly attach the hook. It is therefore one object of the present invention to attach the hook to the body of the spoon by removable means to save labor and make for simplicity.

Another object is to provide a guide for the shank of the hook which anchors the same against motion in any direction, so that the hook is rigidly held to the spoon.

An additional object is to devise an improvement which is very simple and highly economical to produce.

With the above objects in view, and any others which may suggest themselves from the description to follow, a better understanding of the invention may be had by reference to the accompanying drawing, in which—

Figure 1:
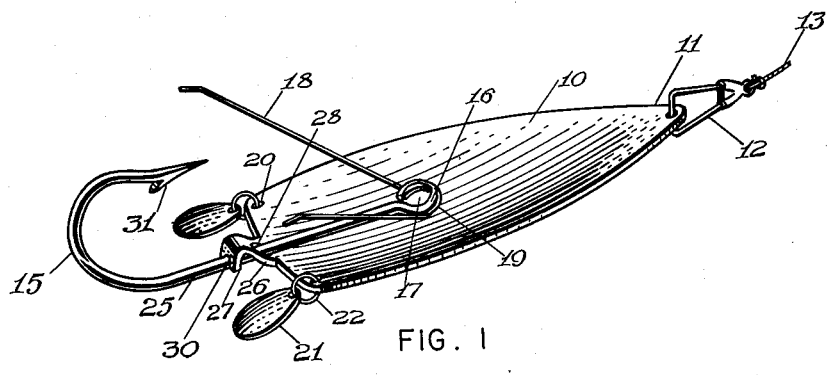
Fig. 1 is a perspective view of the improved lure.

In accordance with the foregoing, specific reference to the drawing indicates the spoon of the improved lure at 10, the same being pointed toward its front end as indicated at 11 to receive attaching means 12 for the line 13.

The hollow of the spoon faces upwardly, and the fish hook 15 is designed to be applied to the upper face of the spoon. Thus, the eye 16 of the fish hook is laid over the central part of the spoon; and the latter is tapped to receive a screw 17 to secure the eye 16 as shown. Since it is of advantage to employ a weed guard 18 in front of the hook 15, the bend 19 of the weed guard is inserted under the eye 16 and therefore secured in place by the screw 17. The spoon is also adapted to be made with holes 20 at the rear corners for the attachment of a pair of spinners 21 by means of ringlets 22.

While the front end of the hook 15 is firmly secured by the screw 17 as described, it is apparent that the rear part of the hook is most apt to receive disturbing influences while in use. Special means are therefore provided for anchoring the shank 25 of the hook in a manner to hold it firmly against influences from any direction to separate the hook from the spoon or swing or bend it in one direction or another.

The special means referred to is a lug 26 which projects rearwardly from the middle portion of the spoon 10. The lug 26 first takes a rising course at an angle and terminates with a substantially vertical downbend 27. The inclined portion of the lug 26 has a longitudinal opening 28; and the bottom of the downbend 27 has a rounded notch 30.

Figure 2:
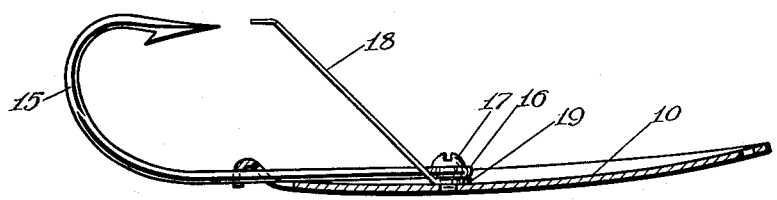
Fig. 2 is a longitudinal section.

The opening 28 is of sufficient length to permit the insertion of the hook by means of its bill 31, which is of course wider at its base than the material of the hook. However, since the opening is in the inclined portion of the lug 26, it leaves no vertical room for play after the hook shank 27 is located in the opening, as is clearly evident from Fig. 2. Since the width of the opening 28 is only sufficient for the passage of the said shank, it follows that the sides of the opening also form stops against the lateral movement of the shank. The shank also seats fully in the notch 30 of the downbend 27, as shown.

It is now evident that in addition to being firmly secured at its front end, the hook is also anchored against lateral and vertical motion at the rear end of the spoon. The lug 26 forms a locking retainer for the shank at a point where influences to raise or distort the hook shank are most apt to occur, and the lug therefore forms a positive stop against such influences without the need of extra fastening means. At the same time, the opening 28 is of a nature permitting the hook to be threaded through the lug despite the extra width of its bill.

Figure 3:
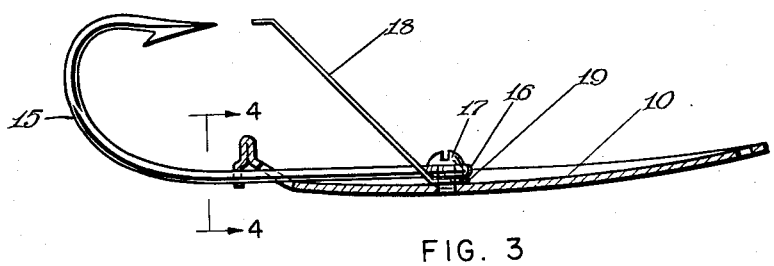
Fig. 3 is a view similar to Fig. 2, showing a modification.
Figure 4:
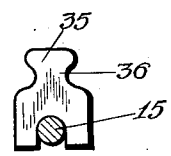
Fig. 4 is a section on the line 4—4 of Fig. 3.

In the modification of Figs. 3 and 4, the crown of the lug 26 is extended upwardly with a headpiece 35 which is reduced at the sides to form a neck 36. This feature is to facilitate the attachment of a pork rind bait in case one is desired.

In conclusion, it is apparent that the improved lure is made with only such parts as are strictly necessary to complete and firmly retain its vital parts, requiring no undue extra expense for its production.

While I have described the invention along specific lines, various minor changes or refinements may be made therein without departing from its principle, and I reserve the right to employ all such changes and refinements as may come within the scope and spirit of the appended claims.

I claim:

1. An artificial fish lure comprising a spoon designed to lie in a substantially horizontal plane when drawn through a body of water, a fish hook at the rear of the spoon and having a shank laid in a longitudinal position on the upper face of the spoon, the forward end of the shank being secured to the spoon, a lug projecting rearwardly from the spoon with an upwardly inclined portion and having a terminal downbend spaced rearwardly from the spoon, an opening in the inclined portion through which the shank of the fish hook extends, and a notch in the bottom of said downbend in which the fish hook shank seats, said opening locking the fish hook against vertical or lateral play, and said notch forming an additional support for the hook shank at a distance from the spoon, the lug including an upwardly extending headpiece having reduced sides to form a prong-like member to receive a piece of pork rind bait or the like.

2. An artificial fish lure comprising a spoon designed to lie in a substantially horizontal plane when drawn through a body of water, a fish hook at the rear of the spoon and having a shank laid in a longitudinal position on the upper face of the spoon, the forward end of the shank being secured to the spoon, a lug projecting rearwardly from the spoon with an upwardly inclined portion and having a terminal downbend spaced rearwardly from the spoon, an opening in the inclined portion through which the shank of the fish hook extends, and a notch in the bottom of said downbend in which the fish hook shank seats, said opening locking the fish hook against vertical or lateral play, and said notch forming an additional support for the hook shank at a distance from the spoon, said upwardly inclined portion rising with a vertical extension which doubles back to form said downbend, and said extension and downbend having reduced sides to form a prong-like member to receive a piece of pork rind bait or the like.

CURTIS F. MELLIN.

REFERENCES CITED

The following references are of record in the file of this patent:

UNITED STATES PATENTS

| Number | Name | Date |
|---|---|---|
| Re. 15,204 | Dubrow | Oct. 11, 1921 |
| 1,997,802 | Meyer | Apr. 16, 1935 |
| 2,203,473 | Shannon | June 4, 1940 |
| 2,214,409 | Eaby | Sept. 10, 1940 |
| 2,319,686 | Janisch | May 18, 1943 |
| 2,492,064 | Rauh | Dec. 20, 1949 |